(No Model.)
B. F. ERWAY.
LISTER CULTIVATOR.
No. 435,291. Patented Aug. 26, 1890.
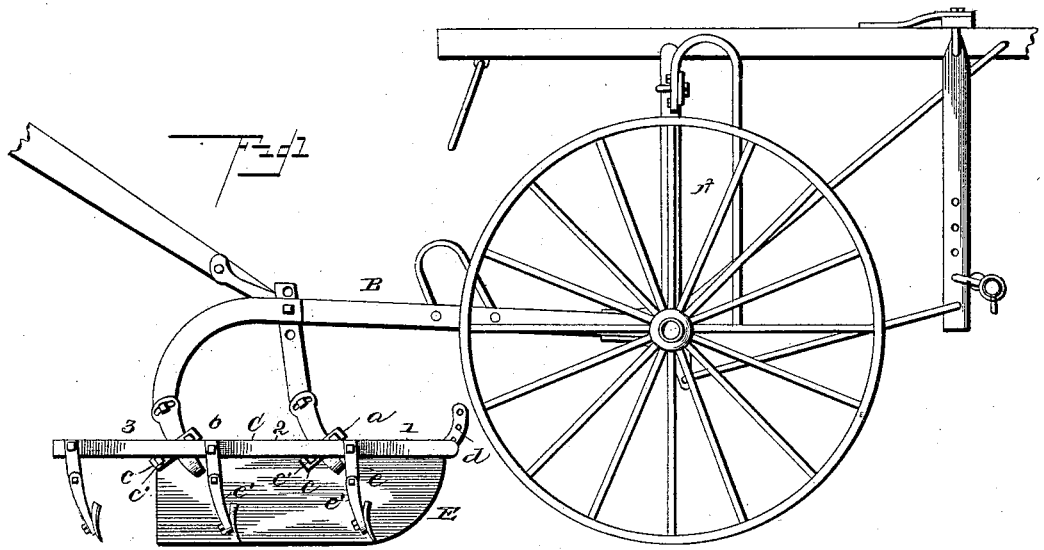
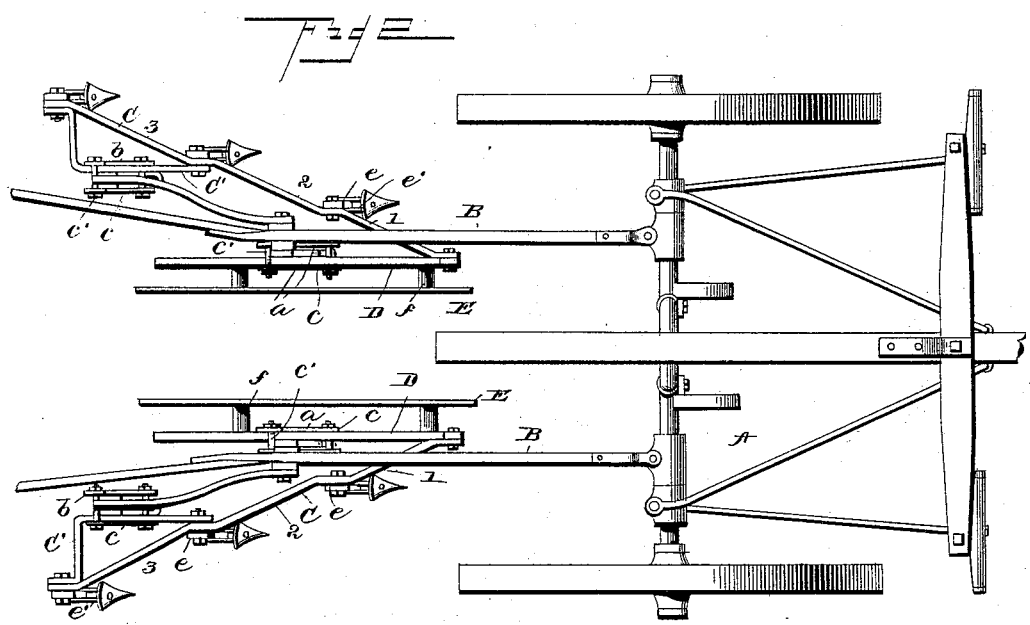
Benjaman F. Erway
Inventor

UNITED STATES PATENT OFFICE.

BENJAMAN F. ERWAY, OF MAPLETON, IOWA.

LISTER-CULTIVATOR.

SPECIFICATION forming part of Letters Patent No. 435,291, dated August 26, 1890.

Application filed May 22, 1890, Serial No. 352,733. (No model.)

*To all whom it may concern:*

Be it known that I, BENJAMAN F. ERWAY, a citizen of the United States of America, residing at Mapleton, in the county of Monona and State of Iowa, have invented certain new and useful Improvements in Lister-Cultivators; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to certain new and useful improvements in straddle-row cultivators.

The object of the invention is to provide a cheap, simple, and effective attachment for such a cultivator, by the use of which I am enabled to use an ordinary straddle-row cultivator in cultivating listed corn; and the invention consists in the construction and combination of the parts, as will be hereinafter fully set forth, and particularly pointed out in the claims.

In the accompanying drawings, Figure 1 is a side view showing my improved attachment applied to a straddle-row cultivator of ordinary construction, and Fig. 2 is a plan view thereof.

A refers to a straddle-row cultivator of ordinary construction, which is mounted on wheels and is provided with beams B B, having two standards, to which the ordinary cultivating-shovels are removably secured, and rearwardly-extending handles. In applying my invention to such a cultivator the cultivating blades or shovels are detached, and by means of clips $a$ and $b$ my invention is secured to the standards of the cultivator. The clips consist of plates $c$ $c$ and clamping-bolts $c'$. The plates are placed over the standards of the cultivator and over the frames of my attachment, as will more fully appear by reference to the drawings.

The frame of the attachment consists of beams C and D, the beam C being made up of a flat bar of metal having three portions 1, 2, and 3 bent on a line with the draft, while the rest is disposed at an angle therewith, and near the rear end is secured an angular bent plate C', over which one of the clips $c$ is placed for attaching the same to the rear standard of the ordinary cultivator. To the portions 1, 2, and 3 of the beam C are secured standards $e$, which consist of vertical bars, to which are bolted, so as to be adjustable thereon, the shovel-supports $e'$, having extended slots to permit of the shovels being adjusted. The supports $e'$ may also be adjustable upon the standards $e$ and are adapted to be connected by a pivot-bolt, so that the lower portions of the standards $e'$ can move upon the pivot in case of contact with a stone or other obstruction.

The bar D of the frame has its front end bent upwardly and is provided with a series of perforations $d$, with which a bar or connection can engage which will extend from the draft attachment of the cultivator, and excepting this projecting end the bar D is straight, and to the rear end thereof is secured a standard. The bar D is also provided at proper points with bolt-holes and blocks $f$, against which the fender E is bolted, said fender being designed to protect the plants and prevent soil being thrown thereon by the cultivator-shovels. It will be observed that the corn or plants being cultivated will pass between the fenders, which are parallel with the line of draft, and also that the beam B of the frame is parallel therewith, while the opposite beam D diverges therefrom.

This attachment is cheaply manufactured and can be used in cultivating corn, whether planted in trenches or otherwise, and the clips employed being adjustable will adapt the device for ready attachment to all straddle-row cultivators.

Having thus described my invention, I claim—

1. As an attachment for straddle-row cultivators, a frame made up of a straight bar D, having an upturned end, a fender carried by and supported to one side of said bar, a beam C, having a series of bends to dispose portions of said beam parallel with the line of draft, and clips for attaching the beams C and D to the shovel-carrying standards of a cultivator, said beams carrying shovels, substantially as set forth.

2. In combination with a straddle-row cultivator having beams, standards depending therefrom, together with frames made up of beams C and D, said beams having rigidly-attached standards and vertically-adjustable shovels, clips for connecting the beams to the standards of the beams B, and fenders E, located to one side and carried by the beams D, substantially as shown, and for the purpose set forth.

3. An attachment for cultivators made up of a bar D, having an upturned end and bolt-holes, blocks $f$, and fenders E secured thereto, a beam C, having bends parallel with the line of draft formed therein, and an angle-plate C', secured adjacent to the rear end of said beam, substantially as shown, and for the purpose set forth.

In testimony whereof I affix my signature in presence of two witnesses.

BENJAMAN F. ERWAY.

Witnesses:
 ED. L. CONLIN,
 J. FLICK.